(12) United States Patent
Medvedev

(10) Patent No.: US 10,477,666 B2
(45) Date of Patent: Nov. 12, 2019

(54) METHOD AND SYSTEM FOR CARRYING OUT PLASMA CHEMICAL REACTION IN GAS FLOW

(71) Applicant: DM ECO Plasma, Inc., Fort Worth, TX (US)

(72) Inventor: Dmitry Medvedev, Fort Worth, TX (US)

(73) Assignee: DM Eco Plasma, Inc., Fort Worth, TX (US)

( * ) Notice: Subject to any disclaimer, the term of this patent is extended or adjusted under 35 U.S.C. 154(b) by 185 days.

(21) Appl. No.: 15/829,360

(22) Filed: Dec. 1, 2017

(65) Prior Publication Data

US 2019/0174616 A1 Jun. 6, 2019

(51) Int. Cl.
```
H05H 1/34      (2006.01)
B01J 12/00     (2006.01)
B01J 19/08     (2006.01)
H05H 1/00      (2006.01)
```
(52) U.S. Cl.
CPC .......... *H05H 1/3405* (2013.01); *B01J 12/002* (2013.01); *B01J 19/088* (2013.01); *H05H 1/0081* (2013.01); *B01J 2219/0809* (2013.01); *B01J 2219/0869* (2013.01); *B01J 2219/0875* (2013.01); *H05H 2001/3442* (2013.01)

(58) Field of Classification Search
CPC .............. H05H 1/3405; H05H 1/0081; H05H 2001/3442; H05H 1/34; H05H 1/42; H05H 1/48; H05H 2001/3484; H05H 2001/3468; B01J 12/002; B01J 19/088; B01J 2219/0809; B01J 2219/0824; B01J 2219/083; B01J 2219/0869; B01J 2219/0875; F02P 9/007; E21B 43/34; E21B 43/26; B03C 1/01; B03C 1/02; B03C 2201/02; B03C 11/00; C02F 2101/32; C02F 2103/10; C02F 1/4608; C02F 1/488; C02F 2103/365; C02F 2201/46175; C02F 1/5236

See application file for complete search history.

(56) References Cited

U.S. PATENT DOCUMENTS

| | | | |
|---|---|---|---|
| 6,629,974 B2 * | 10/2003 | Penny | A61B 18/042 128/898 |
| 2017/0081221 A1 * | 3/2017 | Namihira | C02F 1/4608 |
| 2017/0311432 A1 * | 10/2017 | Eckert | H05H 1/34 |

* cited by examiner

*Primary Examiner* — Xiuyu Tai
(74) *Attorney, Agent, or Firm* — Bardmesser Law Group

(57) ABSTRACT

A plasma chemical reactor including an anode having a generally cylindrical shape and an axis of rotational symmetry; a cathode inside the anode and co-axial with the anode; a hot plasma channel between the between the anode and the cathode; a gas input module providing gas flow into the anode; a gas output module at a distal end of the anode; and a high voltage power supply providing with a current in a range of 0.1-1.0 A. The high voltage power supply provides a voltage to the cathode in a range of 0-5 kV, a power of at least 1 kW, and a voltage/current ratio of at least 1000 V/A.

9 Claims, 13 Drawing Sheets

Repeated breakdowns

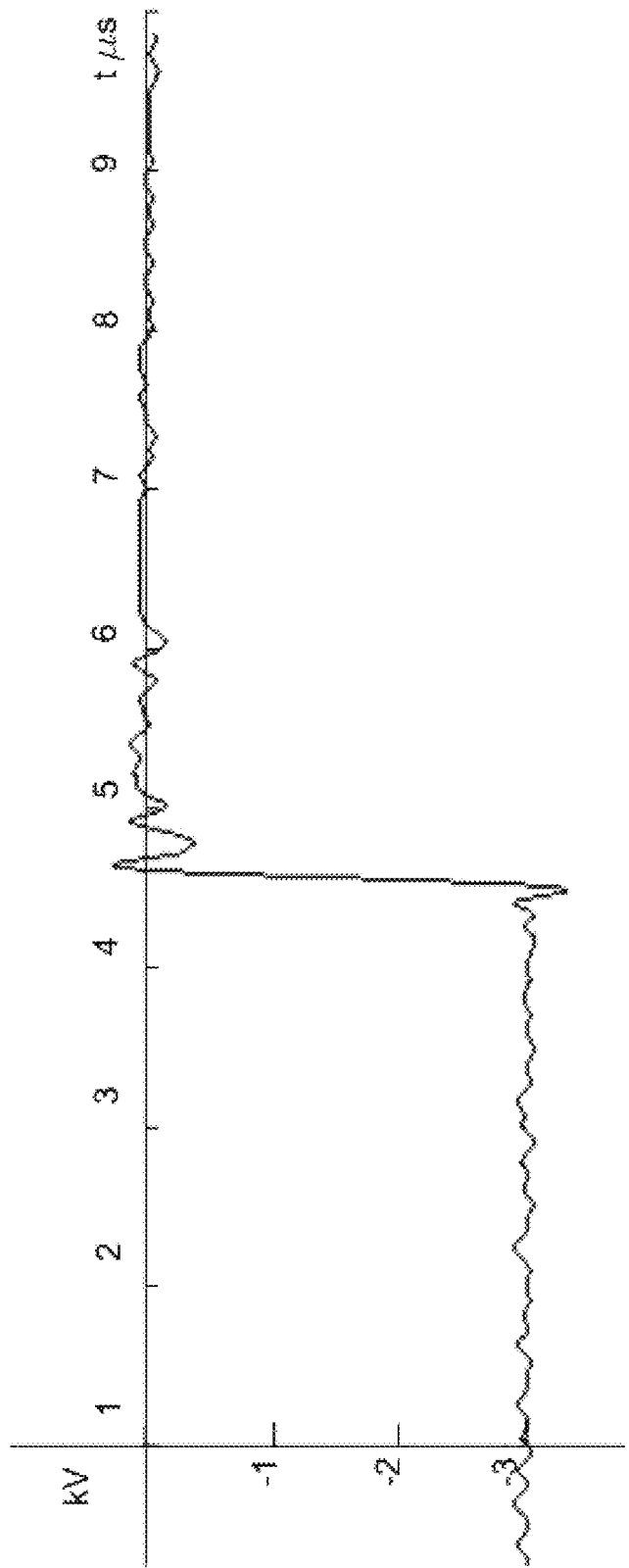

G- one or several high frequency AC or pulse generators

T- one or several high frequency or pulse high voltage transformers

DB – high voltage bridge, D – high voltage diode, C – high voltage capacitor

M – modules M(A),M(BM(C),M(B) from FIG. 10 can be connected with each other series, parallel or series and parallel to provide desirable current and voltage to plasmatron.

METHOD AND SYSTEM FOR CARRYING OUT PLASMA CHEMICAL REACTION IN GAS FLOW

BACKGROUND OF THE INVENTION

Field of the Invention

This invention relates to low current high-voltage plasmatrons and their use for stimulation of chemical reactions with a high activation barrier, plasma chemical reactors, plasma assisted combustion and laboratory purposes.

Description of the Related Art

Plasma is a powerful instrument for carrying out of chemical reactions with high activation energy such as, for example, syngas production, $CO_2$ dissociation, $H_2S$ dissociation, etc. Regular plasma technologies, such as thermal electric arc or microwave electric discharge and non-equilibrium plasmas like DBD, or corona discharges, have some disadvantages for plasma chemical applications. The problem is to provide optimal conditions for carrying out direct chemical reactions (chemical reactions which transmit initial reagents to the substances needed) and to prevent to the extent possible the reverse chemical reactions. Also, the conditions providing useful recuperation of various types of energy losses in plasma have to be created.

These problems can be considered separately.

Optimal conditions for direct chemical reactions can be provided by plasma dissociation or excitation of initial molecules up to radicals, or other active particles, so that they can react to produce desired products. There are two main ways to achieve this result. The first way is to modify initial molecules by direct electron collision. In this case, the key feature of plasma conditions is electric field strength that needs to be high enough for electron acceleration up to the energy is sufficient for converting molecules into desirable radicals or active particles. This is typical for all kinds of non-equilibrium discharges like DBD (i.e., dielectric barrier discharge) or corona. The term "non-equilibrium" means in this case that all gas molecules are still cold but electrons have extremely high energy capable to dissociate molecules. The problem with this is that all energy of the electrons, which during acceleration process goes into the heating of the gas, is lost. This is irreversible energy loss, and usually this loss is many times higher than dissociation energy and is certainly higher than the enthalpy of reaction.

The other approach, opposite of the first one, is to heat up all gas molecules up to a temperature which will be sufficient to overcome the activation barrier of the reaction. At first glance, this approach appears not to be as effective as the first one, because in this case energy has to be spent for heating all the molecules, not only the ones needed for the reagent. But if the reaction products are removed from the heating zone as fast as possible, this approach will have evident advantages because of a simple reason—in this case the energy which will go into heat will not be lost and will do useful work. This approach is typical for the all-thermal electric discharges like arc, microwave, RF, inductively coupled and all their analogues.

There were several interesting ideas to combine the non-equilibrium and thermal approaches, i.e., to use some transient form of electric discharge where chemical reactions can be stimulated by energized electrons but gas will not be completely cold. It would have some significant background temperature. In this case we need to provide hot electrons not with all the energy required for the dissociation but only part of this energy. In this situation the energy of electrons which will go into heat will not be completely lost and can increase total energy efficiency of the process. These electric discharges sometimes are called "warm discharges" and will be considered later (0018).

Inhibition of reverse chemical reactions (reactions in which final useful products react to form again initial reagents) is called "quenching" reaction products. The most obvious solution of this problem is to remove products from the reaction zone as soon as possible. It can be achieved if the plasma is not spatially uniform and moves with respect to the gas.

Recuperation of energy which has been spent on reaching the reaction activation barrier (when the reaction is over) is an important condition of energy efficiency of the process. For example, if the reaction accomplishes the dissociation of molecules into atoms or radicals, after the reaction is over these atoms recombine and create new molecules as a result of recombination. Some amount of energy in this process will be released and should be utilized for next reactions.

Therefore, energy efficient plasma chemical rector should have the following features:

1. Efficient overcoming of activation barrier of reaction
2. Efficient quenching of reaction products
3. Efficient recuperation of energy released by the products of the reaction, the newly formed molecules
4. System's lifetime should be acceptable for industry To fulfill these conditions for wide region of chemical reactions a plasma chemical reactor with following key features is needed:

1. Flexible and controllable, to a reasonable degree, non-equilibrium plasma;
2. Flexible and controllable, to a reasonable degree, spatial non-uniformity of plasma;
3. Potentiality of scaling-up to a desirable power level without losing efficiency.

A relatively promising combination of features for an optimal solution of plasma converter can be found in US 2012/0090985 A1. This concept is based on the electrical discharge called gliding arc. The classical form of gliding arc electrical discharge can be seen in FIG. 1.

After applying voltage to the electrodes, the electric breakdown takes place in the narrowest gap. Then the electric arc appearing after breakdown starts moving in the gas flow from the point with narrowest gap, so that the arc filament elongates. Voltage applied to this arc filament increases because of the increase of the filament length. At the moment when this voltage becomes sufficient for a new breakdown at the point with narrowest gap the secondary breakdown takes place and the process continues again and again. This repetitive mode is characteristic of different types of gliding arcs, such as rotating gliding arc, see Angjian Wu, Xiaodong Li, Jianhua Yan, Jian Yang, Changming Du, Fengsen Zhu, Jinyuan Qian, *Co-generation of hydrogen and carbon aerosol from coalbed methane surrogate using rotating gliding arc plasma* (Applied Energy, Vol. 195, 1 Jun. 2017, pp. 67-79). It should be noted that the rotating gliding arc can also function in a stationary arc length mode.

Rotating gliding arc geometry is shown in FIG. 2. In the case of rotating gliding arc, both electrodes have a 3-D rotational shape coaxial relative to each other. A high voltage electrode is installed inside the grounded electrode. Gas flowing in the gap between the electrodes has a tangential speed component and flows spirally. In this case, after the first breakdown in the narrowest gap, the arc filament starts elongating and rotates at the same time. In the case of the rotating gliding arc two scenarios are possible. In the first case, the repetitive mode with periodical breakdowns in the narrow gap is possible just as in the case of regular gliding arc. In the second case, the arc filament can start continuing rotation at the end of electrodes' system if the voltage is not high enough for a new breakdown.

FIG. 3 illustrates current and voltage waveforms of rotating gliding arc in a repetitive mode. One can observe periodical increase of voltage and its drop down to a certain level. The level of minimal voltage is determined by the voltage at a new breakdown point.

Rotating gliding arc has some advantages compared to regular gliding arc when used in a plasma-chemical reactor. There are two reasons for that. The first reason is that in this case relative velocity of gas and plasma filament can be higher because of additional tangential gas velocity. This way rotating gliding arc can provide better conditions for quenching process in comparison to the regular gliding arc. The other advantage is relative flexibility of plasma parameters, because it is possible to change the ratio between the tangential and linear gas speeds. Therefore, it is possible to control the equilibrium state of plasma to some degree.

A major disadvantage of such geometry is relatively small arc filament length in comparison with the reactor's dimensions.

Gliding arc in a reverse vortex described in US 2012/0090985 A1 can address some disadvantages of the rotated gliding arc. For example, in this geometry, the arc filament's length is equal to a full length of the reactor because of reverse vortex. The equilibrium state of plasma also can be partially controlled by changing of electric parameters of power supply and gas dynamics in discharge chamber.

A disadvantage of gliding arc in reverse vortex is a narrow region of changing plasma parameters achievable in this kind of discharge. The region of gas velocities which can provide conditions for the revers vortex creation and the corresponding gliding arc discharge form are limited and create limitations for plasma parameters region. Another limitation of this kind of discharge is the limitation on gas velocity in the discharge chamber. It cannot be higher than several meters per second, because of the discharge chamber geometry and because of the arc breakup.

SUMMARY OF THE INVENTION

Accordingly, the present invention is related to an arc reactor utilizing a plasma chemical reaction in gas flow that substantially obviates one or more of the disadvantages of the related art.

In one aspect, there is a provided a plasma chemical reactor including an anode having a generally cylindrical shape and an axis of rotational symmetry; a cathode inside the anode and co-axial with the anode; a hot plasma channel between the between the anode and the cathode; a gas input module providing gas flow into the anode; a gas output module at a distal end of the anode; and a high voltage power supply providing with a current in a range of 0.1-1.0 A. The high voltage power supply provides a voltage to the cathode in a range of 0-5 kV a power of at least 1 kW, and a voltage/current ratio of at least 1000 V/A. More generally, the high voltage power supply provides a voltage to the cathode in a range of 0-5 kV for each 1 kW of power (i.e., for 1 kW, the power supply ranges 0-5 kV, for 10 KW, the power supplies ranges 0-50 kV, etc.)

Optionally, the high voltage power supply limits current by output reactive resistance based on a series capacitor. Optionally, the high voltage power supply limits current by output reactive resistance based on a series inductor. Optionally, the high voltage power supply limits current by output reactive resistance based on a series inductor adjustable by a biased magnetic core. Optionally, the high voltage power supply limits current by output reactive resistance based on a reactive resistance. Optionally, a gas recirculation line recirculates some of the gas from the gas output module back into the hot plasma channel.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

Figure 7A:
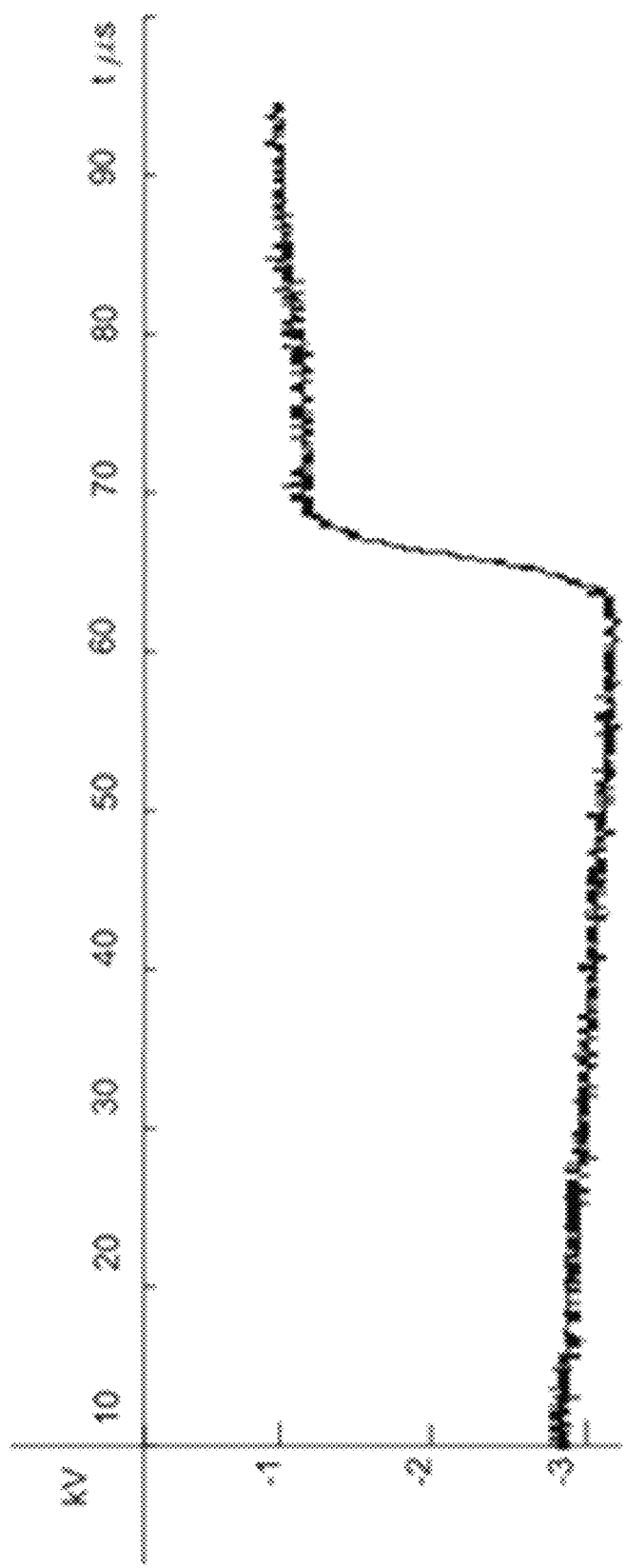

FIGS. 7(A) and 7(B) illustrate a timing of voltage drops during secondary breakdown in the proposed plasma reactor.

Figure 8A:
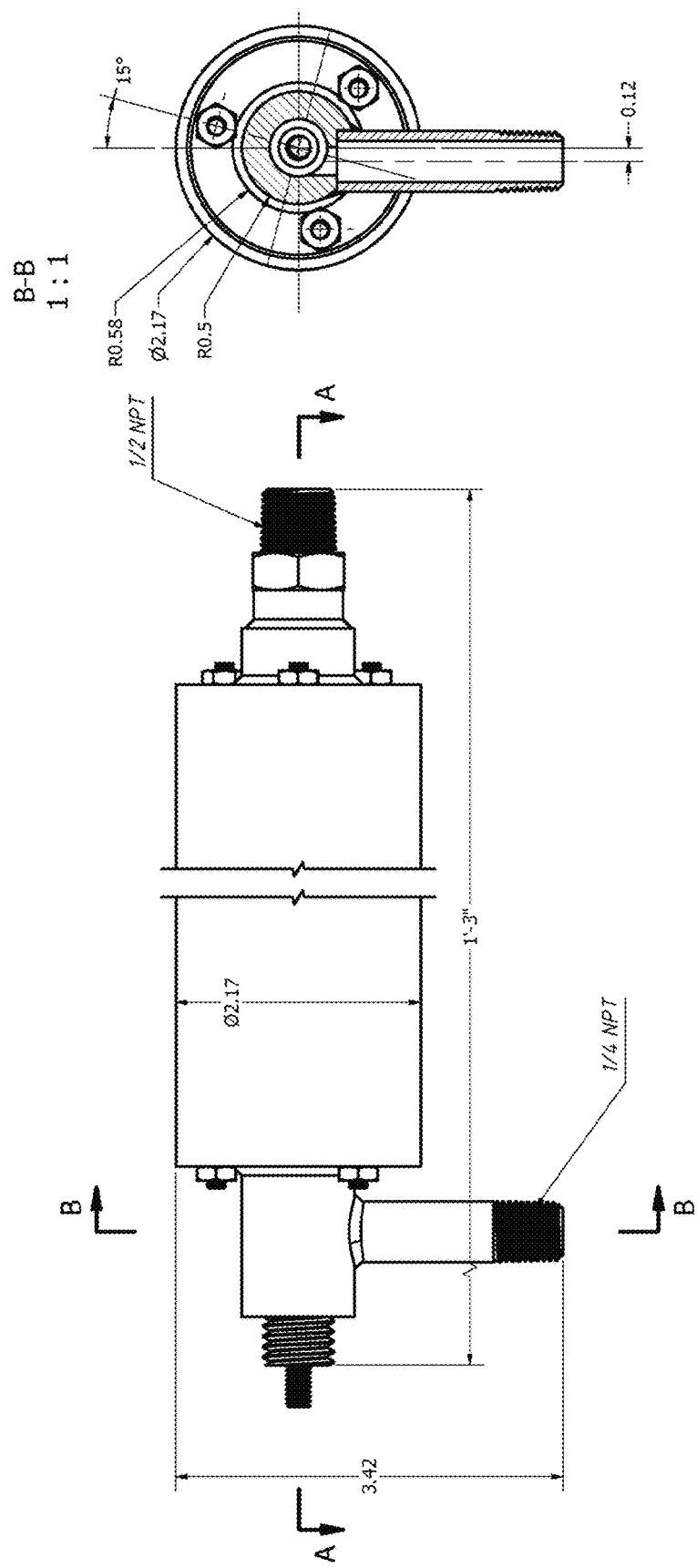
Figure 8B:
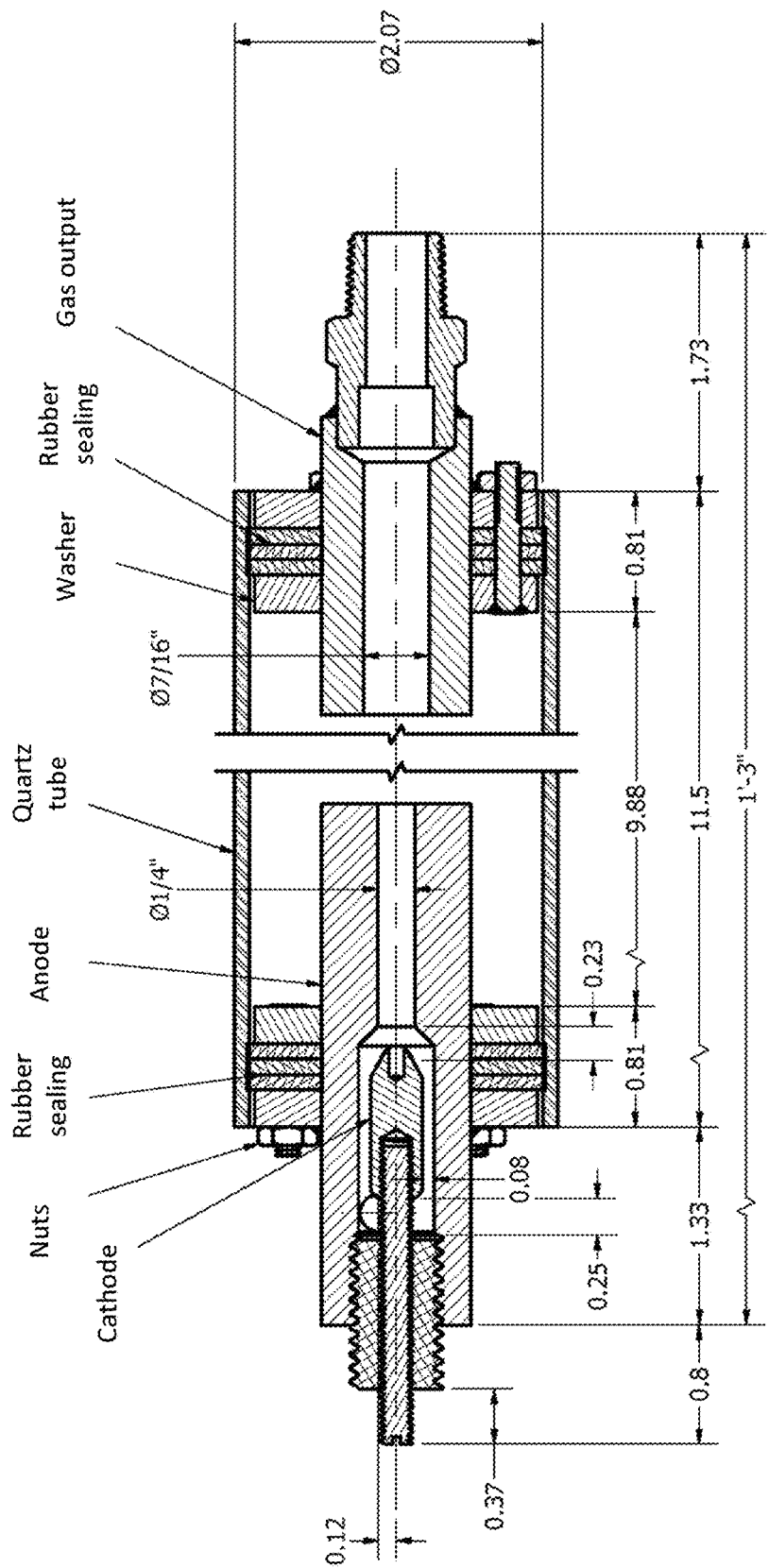

FIGS. 8(A), 8(B) show typical exemplary dimensions of the plasma reactor based on low current.

Figure 9:
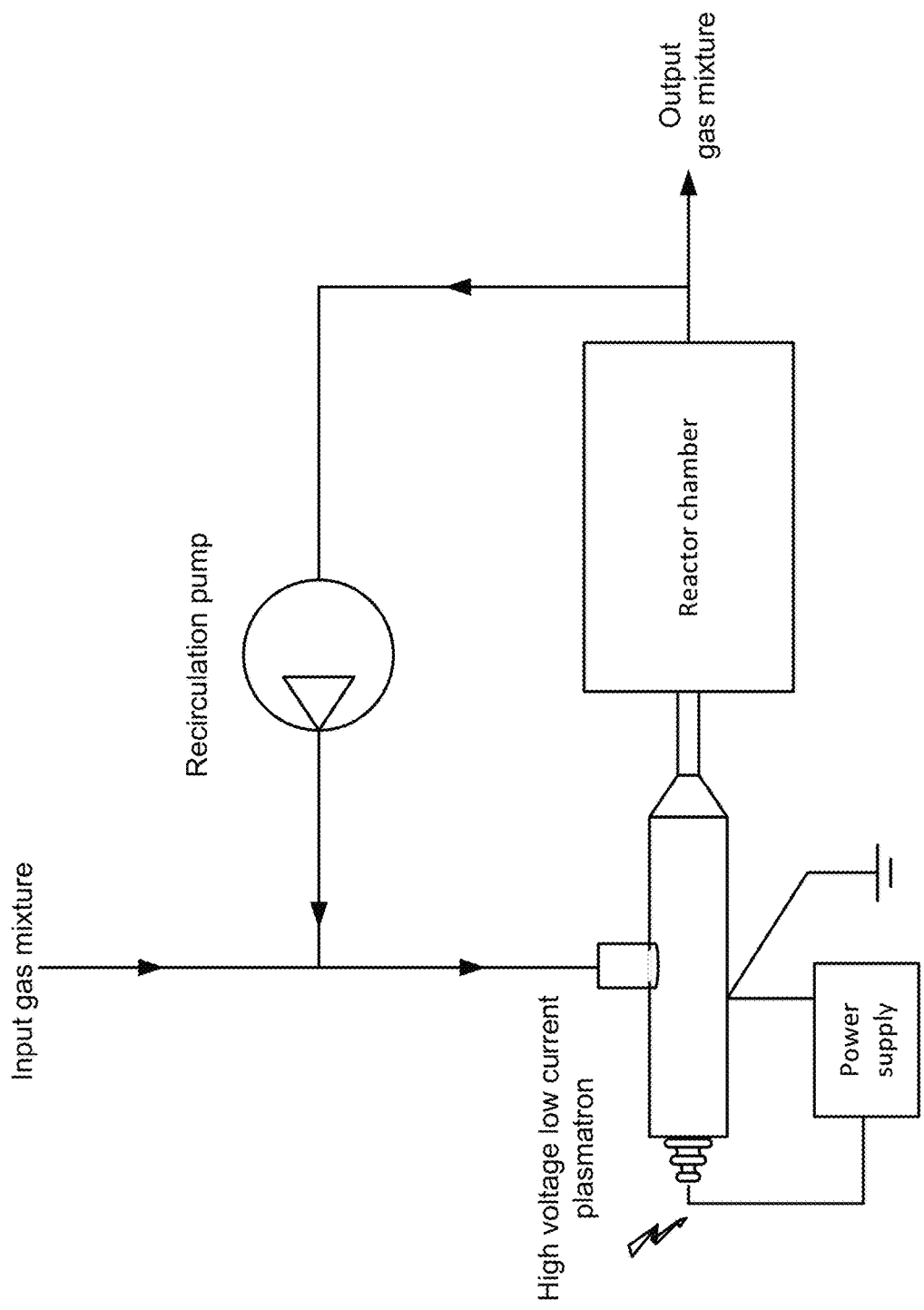

FIG. 9 shows gas circulation in the plasmatron of the present invention.

Figure 10:
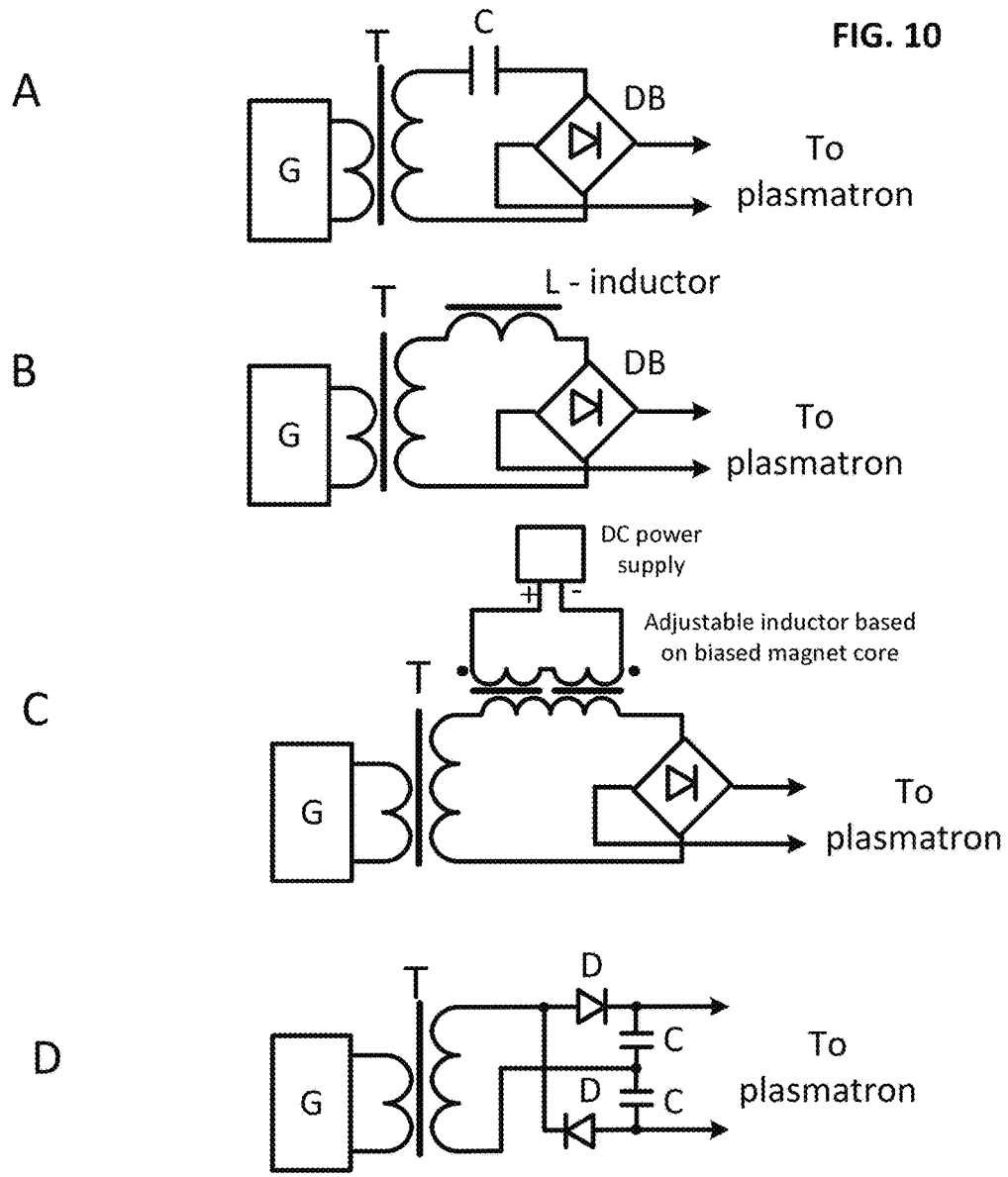

FIG. 10 shows typical electrical schematics that can be used for power supply of plasmatron of present invention.

Figure 11:
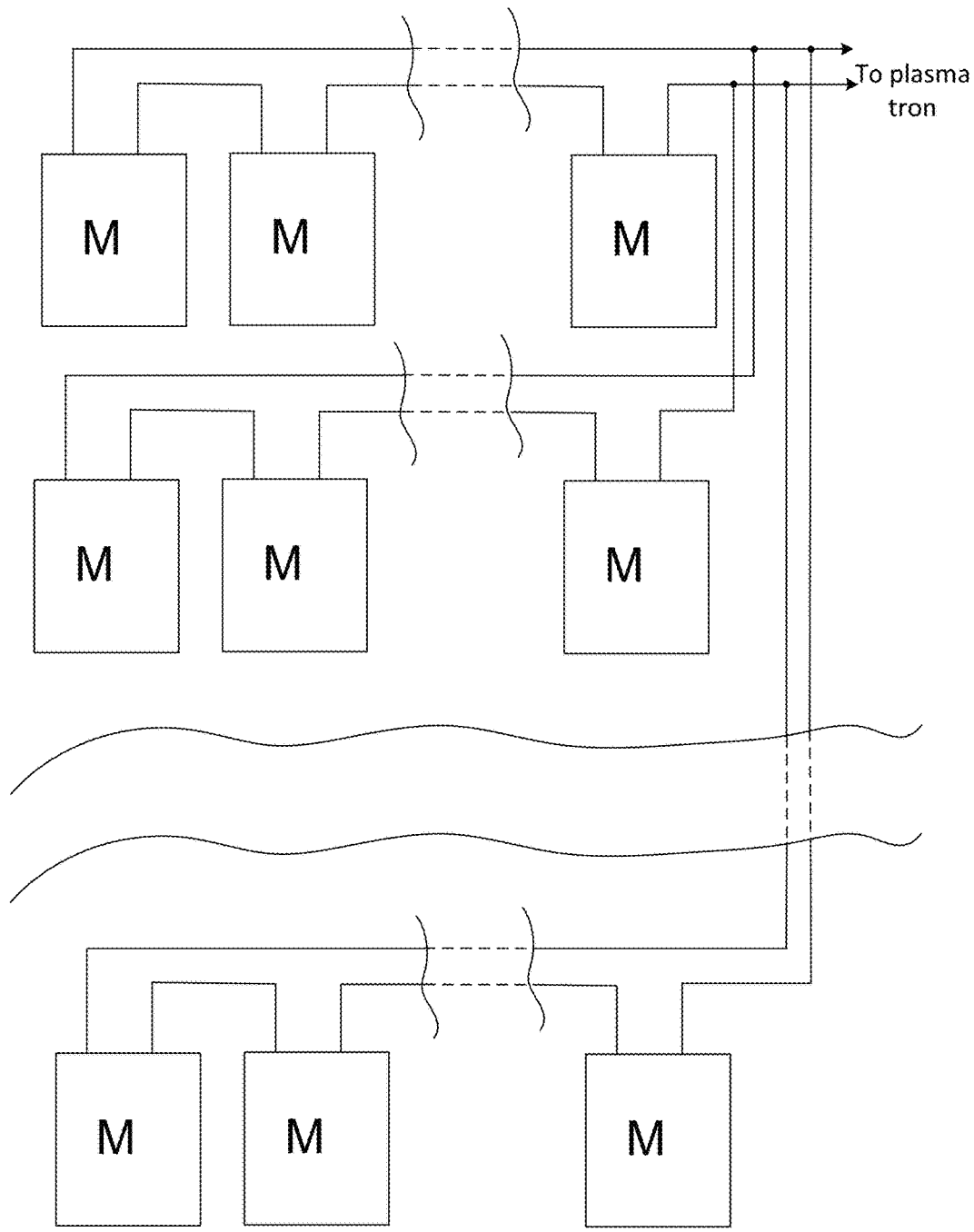

FIG. 11 shows possible electrical connections of modules shown in FIG. 10 that can be used for power supply of the plasmatron to provide desirable voltage and current.

DETAILED DESCRIPTION OF THE PREFERRED EMBODIMENTS

Reference will now be made in detail to the preferred embodiments of the present invention, examples of which are illustrated in the accompanying drawings.

Figure 1:
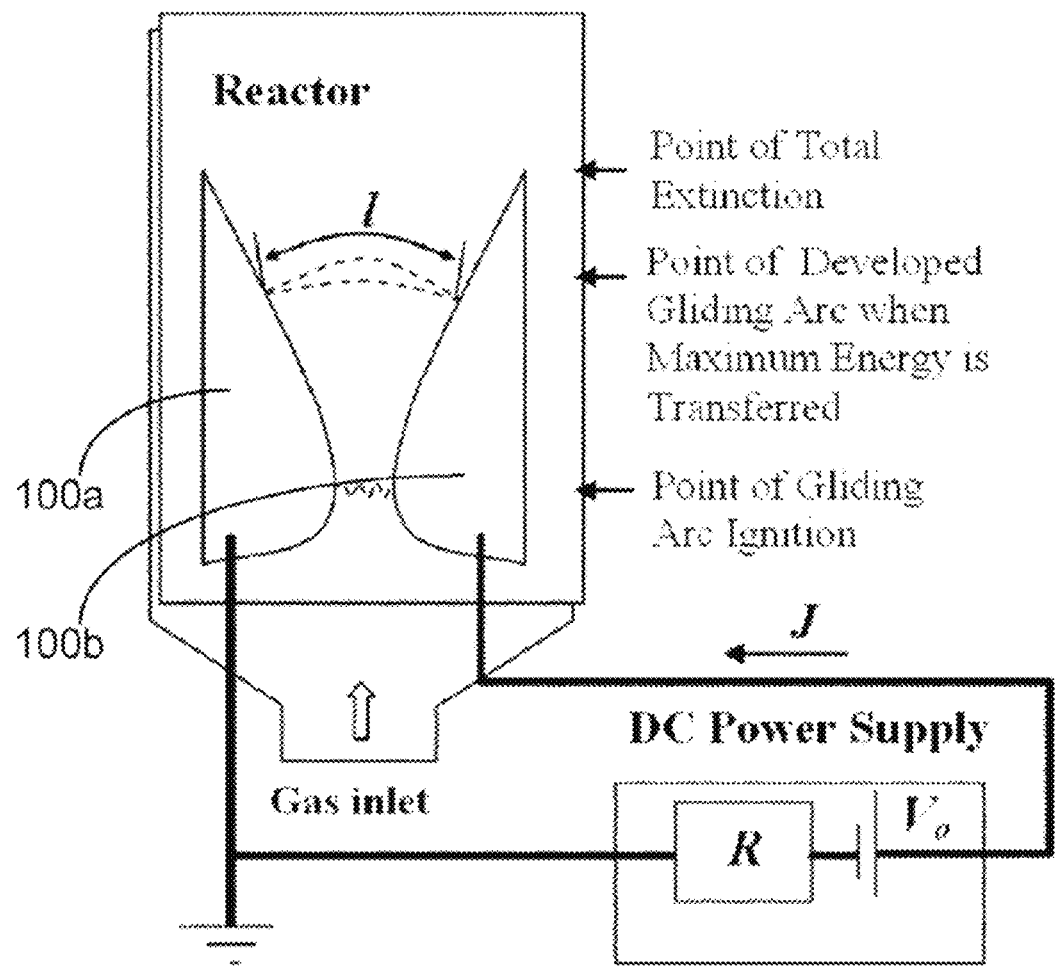
FIG. 1 illustrates a classical form of a gliding arc electrical discharge.
Figure 2:
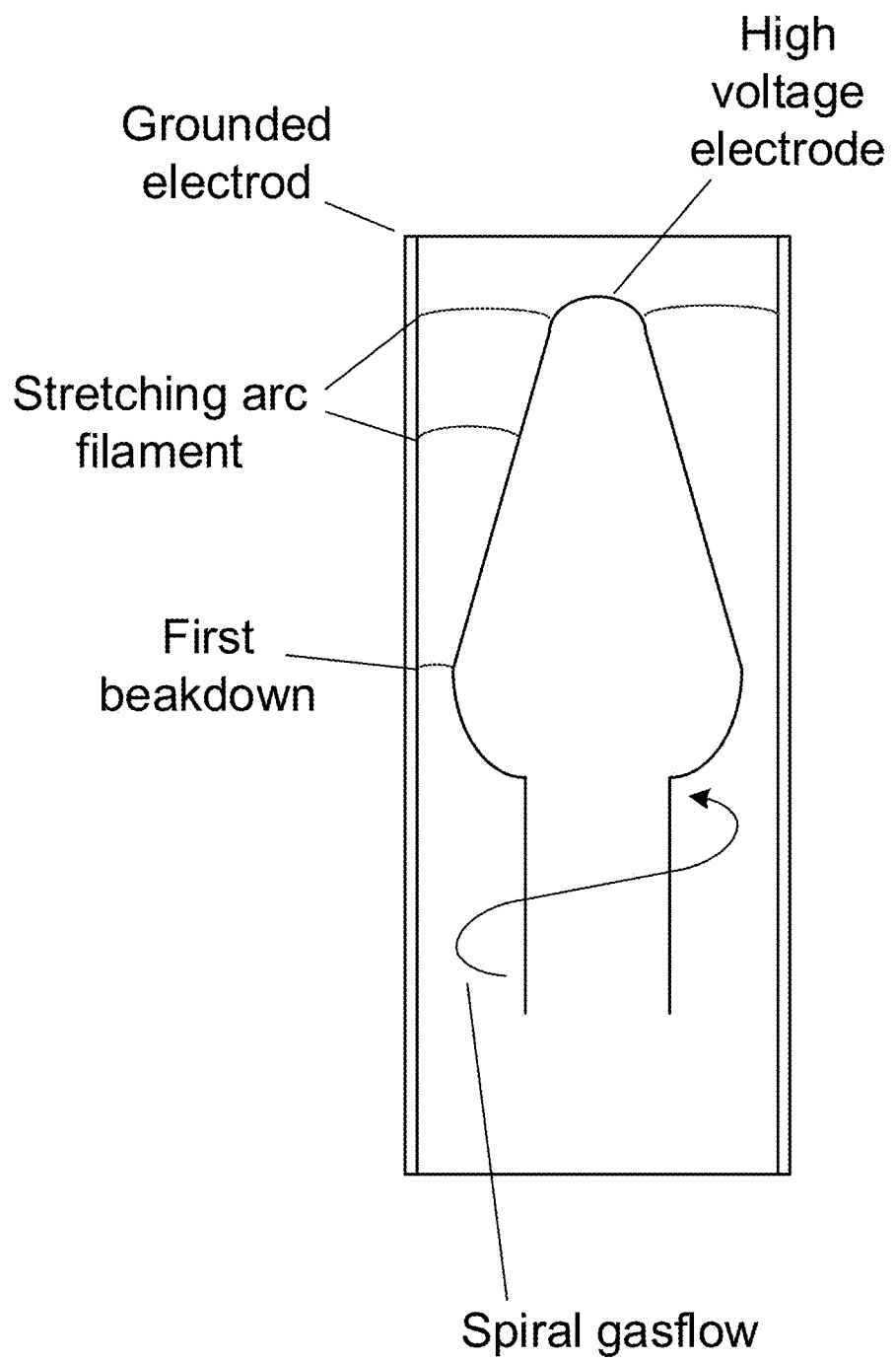
FIG. 2 illustrates a rotating gliding arc geometry.
Figure 3:
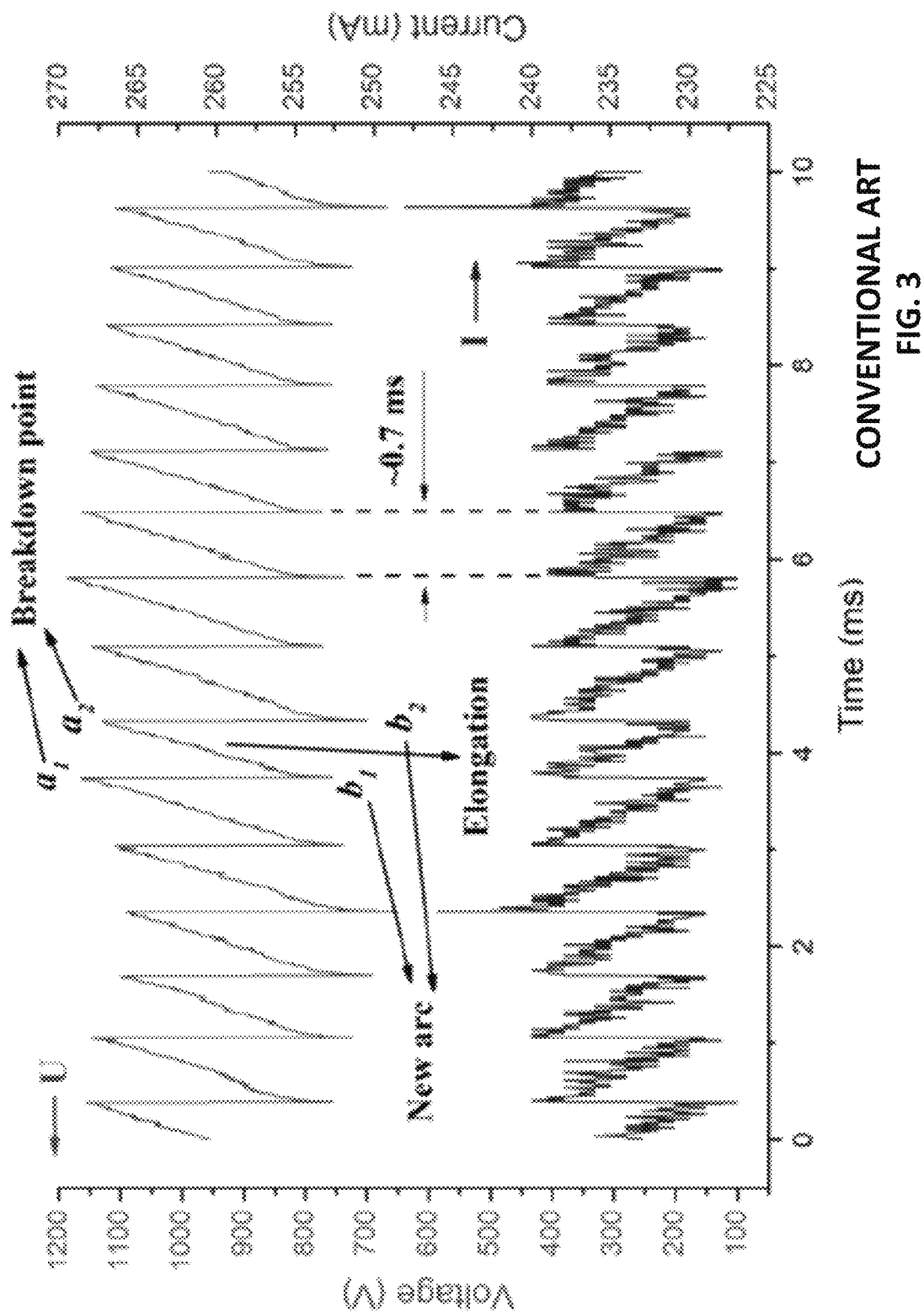
FIG. 3 illustrates current and voltage waveforms of rotating gliding arc in a repetitive mode.
Figure 4:
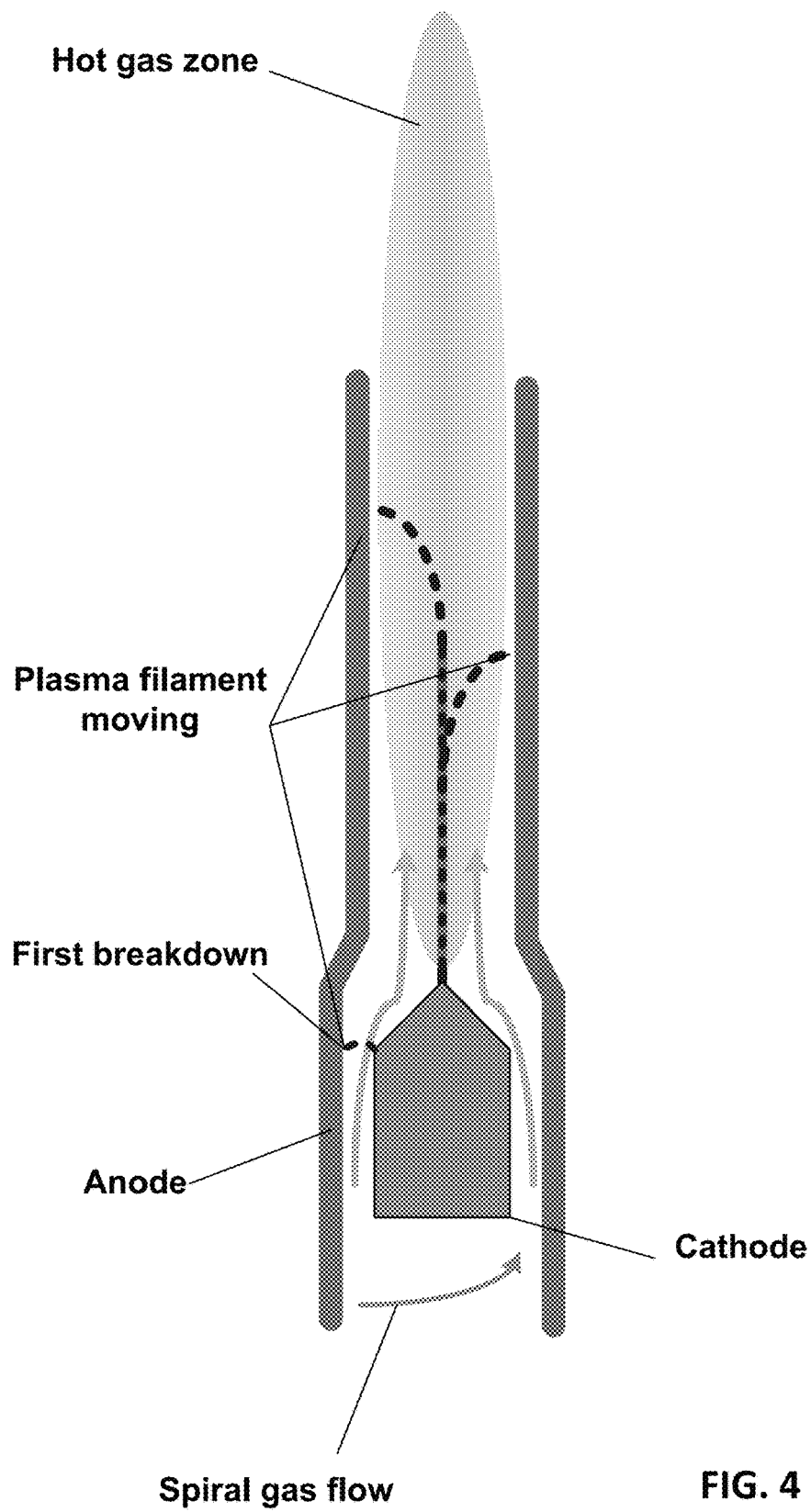
FIG. 4 illustrates a geometry and arc filament development in the proposed arc reactor.

The solution to the problems of the conventional art identified above are based on electrical discharge with characteristics and behavior similar to the gliding arc discharge but with the geometry resembling regular arc plasmatrons, see FIG. 4. The anode in this case has a 3-d rotationally symmetrical shape (similar to the rotating gliding arc) and a long narrow output channel whose internal diameter can be about 2-10 mm and length can be 10-200 mm, depending on power. The cathode is installed in a wide part of channel coaxially to the anode before the output channel. Typical cathode diameter is about two times larger than the diameter of output plasma channel. The gap between cathode and anode can be about 0.5-5 mm. Gas flows through the gap between the anode and the cathode spirally.

Figure 5:
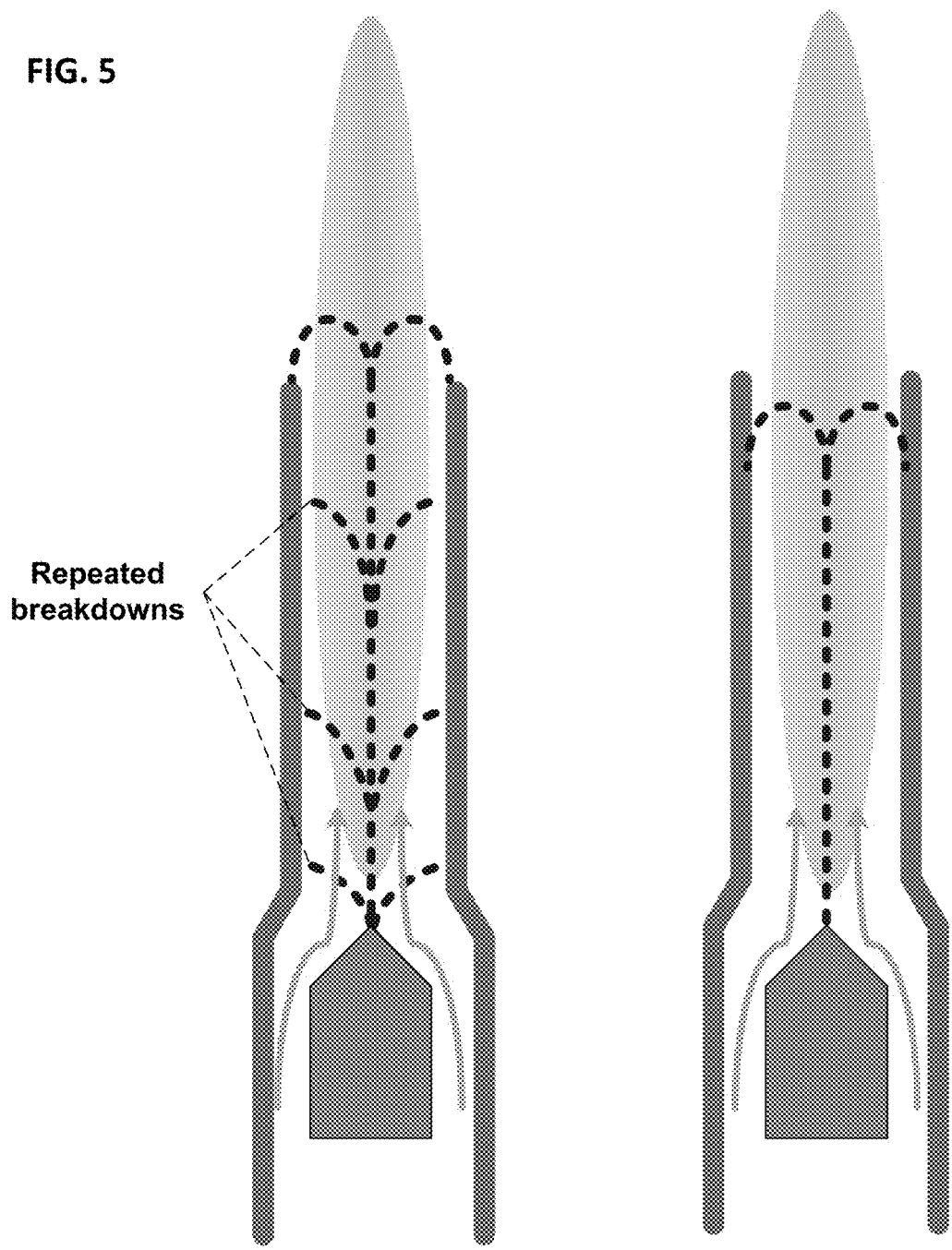
FIG. 5 illustrates possible scenarios of electric discharge behavior in proposed plasma reactor geometry.

Initially, the electrical discharge starts developing similar to the rotating gliding arc geometry. After the first breakdown in the narrowest location, the plasma filament starts moving due to the gas flow. When the arc filament reaches the cathode's tip, one end stops moving and the filament starts stretching inside the output channel. Because of the arc filament elongation, the voltage increases and, finally, two scenarios are possible, see FIG. 5.

Figure 6:
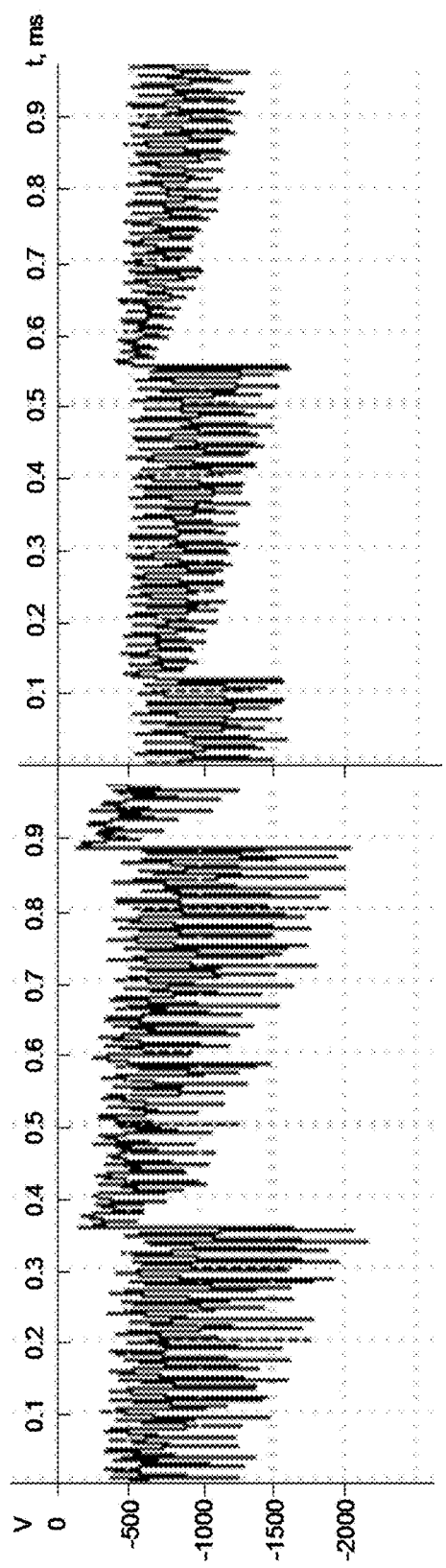
FIG. 6 illustrates two versions of voltage waveform characteristics in the proposed plasma reactor.

In the first case the arc will elongate up to some maximum length determined by the maximum voltage, which power supply can provide and keep the arc going. If the voltage corresponding to this maximum arc length is not sufficient for creating a new breakdown in the arc channel, a stable arc mode will form. This stable arc mode is typical for a regular high current arc plasmatron. In our case, we use a power supply with special volt-ampere characteristics (i.e., same power and similar dimensions of the plasmatron as conventional plasmatrons, but a voltage roughly 10 times as high). While operating in the high voltage mode, the voltage applied to the plasma filament becomes high enough for a secondary breakdown at some point. Depending on this new breakdown point, the breakdown character will change. In some cases voltage drops practically down to zero, and in other cases the voltage drops down to some base residual voltage, see FIG. 6. On the left, the voltage drops to base −100 V and on the right to base voltage −500 V.

The time of this voltage drop is also different and is determined by the residual voltage. As seen in FIGS. 7(A) and 7(B), if the base voltage is close to zero, the voltage drop time is about 100 ns, which is characteristic for a regular time of breakdown development directly between the anode and the cathode. In the case when the base voltage is high the drop time is about 5 μs (fifty times longer). This long breakdown time can be explained in this case by the breakdown taking place not from the cathode to the anode but by directly going from some point on the plasma filament. The rest of the plasma filament in this case work as a series resistor and increases the voltage drop time and the voltage base.

These two different types of breakdowns in plasmatron in a high voltage mode of electrical discharge are determined by different currents and air flows—FIG. 7(A) corresponds to high current and small air flow, and FIG. 7(B) corresponds to low current and high air flow.

Voltage base increases with operating current increasing and, finally, the electrical discharge will transform to regular arc plasmatron discharge. Also, the voltage base will decrease with gas flow increasing and will increase with operating pressure increasing.

Consider the location of the secondary breakdown, which takes place in the plasmatron channel. The location of this secondary breakdown is determined by two competing factors. The first factor is the temperature inside the channel, which is increasing along the channel from the cathode to the anode. The second factor is the voltage, which is increasing in opposite direction and reaches its maximum on the cathode. In the regimes when the plasma channel is cold (roughly 280-320° K.), the location of a breakdown moves to the cathode and the base of the voltage in voltage waveform drops down to zero. In the regimes with a hot channel (roughly 400° K.-2000° K.), the location of the breakdown moves from the cathode and the base of the voltage increases.

The proposed approach provides natural and efficient solution of quenching problem and at the same time reduces the system's operation costs. Electrical discharge of this type provides for low current and high voltage plasma filament moving in a hot plasma channel by rotating gas flow. The geometry of such system resembles somewhat the geometry of the conventional arc plasmatron, but the current is ten times smaller and the voltage in ten times higher. This result can be reached by a combination of power supply with special volt-ampere characteristic and optimization of electrodes' shape. Optimization of electrodes' shape is intended to maximally increase the gap between the plasma filament and the anode to increase the voltage of secondary breakdown and at the same time to keep gas velocity sufficient for plasma filament elongation.

Such an approach creates thin plasma filaments with sharp borders, which move fast and work on new gas regions. This way initial reagents initial can be worked on, in order to create the intended final reaction products, and, in practice, avoid reverse chemical reactions by fast movement of plasma channel. At the same time, a dramatic decrease of current in the plasma filament minimizes electrodes' erosion and decreases energy losses in electrode layers. At the same time there is an increase in efficiencies of the process and minimization of its operating costs. This result opens opportunities for practical application of plasma technology.

Experiments found a form of gas discharge that represents a convenient plasma instrument for a gas converter that has all the significant features important for such a device:

(1) The system can provide conditions necessary for direct chemical reactions with a high activation barrier. Hot conductive plasma channels with high dissociation degree and relatively high voltage provide a controllable and desirable degree of equilibrium of the plasma. The degree of equilibrium can be controlled in a wide region, from the conditions close to the equilibrium characteristic for a regular arc plasmatron up to the conditions in a high voltage gliding arc with a high degree of non-equilibrium.

(2) A high degree of spatial non-uniformity of the plasma channel and fast motion of plasma channel relative to the gas provides necessary quenching conditions. Gas velocity is several times higher than in the gliding arc (up to 100 m/sec).

(3) Geometry characterized by a thin plasma filament rotating inside the hot zone with desirable and controllable temperature provides conditions for recuperation of energy losses, which go into heating of ambient gas. In this situation, the heat can be re-used.

(4) This system has extremely low electrodes' erosion because of low current compared to conventional arc plasmatrons. The discharge current was decreased more than ten times (compared with arc) with the same power of the discharge, preserving small dimensions and all basic features of arc plasmatron. For example, for low current plasmatron with a power 1 kW typical current is 0.5 A with a voltage 2 kV, but for a regular plasmatron with a power 1 kW and the same dimensions, typical current is 6 A with a voltage 180 V.

Example #1

Conversion of $CO_2$ in plasma-chemical reactor based on low current high voltage plasmatron was performed. $CO_2$ was input to the system that includes a high voltage plasmatron designed according to the above description, heat exchanger and recirculation pump. Gas goes through plasmatron, than goes through heat exchanger for cooling and then part of gas goes back to the plasmatron input and another part of gas goes to the output for gas analysis.

Parameters of Experiment:
1. Plasmatron input power: 1600 W
2. Input $CO_2$ flow rate: 2 $m^3/h$
3. Recycle pump flow rate: 25 $m^3/h$
4. Plasmatron output channel diameter: 6 mm Output Gas Composition:
CO: 15%
$O_2$: 7.5%
$CO_2$: 77.5%

Example #2

Conversion of $CO_2$ in plasma-chemical reactor based on low current high voltage plasmatron was performed. $CO_2$ was input to the system that includes a high voltage plasmatron designed according to the above description, heat exchanger and recirculation pump. Gas goes through plasmatron, than goes through heat exchanger for cooling and then part of gas goes back to the plasmatron input and other part of gas goes to the output for gas analysis.

Parameters of Experiment:
1. Plasmatron input power: 1600 W
2. Input $CO_2$ flow rate: 2 $m^3/h$
3. Recycle pump flow rate: 5 $m^3/h$
4. Plasmatron output channel diameter: 6 mm Output Gas Composition:
CO: 11%
$O_2$: 5.5%
$CO_2$: 83.5%

Example #3

Conversion of $CO_2$ in plasma-chemical reactor based on low current high voltage plasmatron was performed. $CO_2$ was input to the system that includes a high voltage plasmatron designed according to the above description, a heat exchanger and a recirculation pump. Gas goes through plasmatron, than goes through the heat exchanger for cooling and then part of the gas goes back to the plasmatron input and another part of gas goes to the output for gas analysis.

Parameters of Experiment:
1. Plasmatron input power: 1600 W
2. Input $CO_2$ flow rate: 2 $m^3/h$
3. Recycle pump flow rate: 2 $m^3/h$
4. Plasmatron output channel diameter: 6 mm Output Gas Composition:
CO: 8%
$O_2$: 4%
$CO_2$: 88%

As can be seen from these examples, gas flow through the plasmatron channel provided by recirculation pump is a one of the important parameters that determine gas conversion efficiency by plasma, because it determines the electric discharge mode.

Typical dimensions of plasma reactor based on low current plasmatron are illustrated on FIGS. 8(A), 8(B), although these dimensions should be taken as exemplary only.

FIG. 9 shows gas circulation the plasmatron of the present invention.

Having thus described a preferred embodiment, it should be apparent to those skilled in the art that certain advantages of the described method and system have been achieved.

FIG. 10 shows typical electrical schematics that can be used for power supply of plasmatron of the present invention. The high voltage power supply provides current limitation by output reactive resistance based on a series capacitor installed in one or several modules see (A) in FIG. 10. The modules can be connected parallel or series with each other. Alternatively, the high voltage power supply provides current limitation by output reactive resistance based on a series inductor installed in one or several modules, see (B) in FIG. 10. These modules can be connected parallel or series with each other. Alternatively, the high voltage power supply provides current limitation by output reactive resistance based on a series inductor adjustable by biased magnetic core which is installed in one or several modules, see (C) in FIG. 10. These modules can be connected parallel or series with each other. The output reactive resistance can also be based on capacitors installed in one or several modules.

FIG. 11 shows possible electrical connections of modules shown on FIG. 10 that can be used for the power supply of the plasmatron to provide desirable voltage and current.

It should also be appreciated that various modifications, adaptations, and alternative embodiments thereof may be made within the scope and spirit of the present invention. The invention is further defined by the following claims.

What is claimed is:

1. A plasma chemical reactor comprising:
   an anode having an axis of rotational symmetry, the anode having a proximal cylindrical portion having a first diameter, a distal cylindrical portion having a second diameter that is smaller than the first diameter, and a conical portion connecting the distal and proximal portions;
   a cathode inside the proximal cylindrical portion of the anode and having a cylindrical portion that is co-axial with the anode, the cathode having a conical tip that extends in a distal direction no further than the conical portion of the anode;
   a hot plasma channel in the distal cylindrical portion of the anode;
   a gas input module providing gas flow into the anode;
   a gas output module at a distal end of the anode, such that the distal cylindrical portion of the anode forms a reaction chamber to break down the gas flow into component gases due to a moving plasma filament in the distal cylindrical portion of the anode; and
   a high voltage power supply providing a current in a range of 0.1-1.0 A,
   the high voltage power supply providing a voltage to the cathode in a range of 0-5 kV and providing power of at least 1 kW, wherein the voltage has a DC component, and
   the high voltage power supply providing a voltage/current ratio of at least 1000 V/A.

2. The plasma chemical reactor of claim 1, wherein the high voltage power supply limits current by output reactive resistance based on a series capacitor.

3. The plasma chemical reactor of claim 1, wherein the high voltage power supply limits current by output reactive resistance based on a series inductor.

4. The plasma chemical reactor of claim 1, wherein the high voltage power supply limits current by output reactive resistance based on a series inductor adjustable by a biased magnetic core.

5. The plasma chemical reactor of claim 1, wherein the high voltage power supply limits current by using a voltage doubling scheme.

6. The plasma chemical reactor of claim 1, wherein the high voltage power supply limits current by an output reactive resistance based on a series capacitor, a series inductor, a series inductor adjustable by a biased magnetic core, or voltage doubling, which connect with each other in parallel, or in series, or in series-parallel.

7. The plasma chemical reactor of claim 1, further comprising a gas recirculation line that recirculates some of the gas from the gas output of chemical reactor back into the gas input of chemical reactor.

8. A plasma chemical reactor comprising:
   an anode having a proximal cylindrical portion having a first diameter, a distal cylindrical portion having a second diameter that is smaller than the first diameter, and a conical portion connecting the distal and proximal portions;
   a cathode inside the proximal cylindrical portion of the anode and having a cylindrical portion that is co-axial with the anode, the cathode having a conical tip that extends in a distal direction no further than the conical portion of the anode;
   a plasma channel in the distal cylindrical portion of the anode;
   a gas input module providing gas flow into a proximal end of the anode;
   a gas output module at a distal end of the anode, such that the distal cylindrical portion of the anode forms a reaction chamber to break down the gas flow into component gases due to a moving plasma filament in the distal cylindrical portion of the anode; and
   a high voltage power supply providing a current in a range of 0.1-1.0 A,
   the high voltage power supply providing a voltage to the cathode in a range of up to 5 kV for each 1 kW of power, wherein the voltage has a DC component;
   the high voltage power supply providing with a voltage/current ratio of at least 1000 V/A,
   wherein the high voltage power supply includes a plurality on series-connected or parallel-connected or series-parallel modules that limit current by an output reactive resistance based on a series capacitor, a series inductor, a series inductor adjustable by a biased magnetic core, or voltage doubling.

9. The plasma chemical reactor of claim 8, further comprising a gas recirculation line that recirculates some of the gas from the gas output of chemical reactor back into the gas input of chemical reactor.

* * * * *